3,061,484
METHOD OF CONTROLLING THE ALUMINUM CONTENT OF AQUEOUS ACID ALUMINUM COATING SOLUTIONS
Nelson J. Newhard, Jr., Oreland, and David Y. Dollman, County Line Park, Pa., assignors to Amchem Products, Inc., Ambler, Pa., a corporation of Delaware
No Drawing. Filed Aug. 4, 1960, Ser. No. 47,363
3 Claims. (Cl. 148—6.16)

This invention relates to the art of applying conversion coatings on the surface of aluminum and alloys thereof in which the predominant ingredient is aluminum, and is particularly concerned with certain improvements in the art of coating aluminum where the surfaces are treated with aqueous acid solutions the essential coat-producing ingredients of which consist of fluorides, hexavalent chromium and phosphates.

The invention is especially useful in situations where the coating solutions are subjected to heavy bath loading, i.e. where large areas of surface are treated per unit volume of bath per unit of time.

Before describing the process in detail certain coating procedures which are now familiar to those skilled in the art should be kept in mind. For instance, it is well known that a high degree of corrosion resistance as well as a decorative appearance can be produced on the surface of aluminum by treating it with aqueous acid solutions or coating baths whose principal and essential coating producing ingredients are fluorides, hexavalent chromium and phosphates and typical examples of processes which employ such solutions are described in United States Patents 2,438,877; 2,472,864; 2,678,291; 2,814,577 and 2,909,455. Coatings produced by the processes of the patents referred to can be applied to enhance the dielectric resistance of aluminum articles, to increase corrosion resistance, to improve the paint bonding properties of the surface as well as to enhance the decorative value of the surface where no paint or other finish is to be employed. Furthermore, depending upon the use to which the coated article is to be applied, the coating solutions and procedures described in the said patents can be employed to produce coating weights which range from as little as a few mgs. per sq. ft. up to as much as 600 mgs./sq. ft.

It can also be seen from the patents referred to that the aluminum coating solutions described generally contain the following constituents in the amounts indicated, i.e. fluoride—from 0.15 to 12.5 gms./liter; hexavalent chromium (expressed as $CrO_3$)—from 3 to 60 gms./liter; and phosphate (expressed as $PO_4$)—from 2 to 285 gms./liter. It will also be seen that such baths operate within a pH range of approximately 0.8 to 4.5.

In employing the solutions described in the patents referred to as well as others of a similar nature, it will be appreciated that some aluminum is dissolved from the surface of the work being treated and remains in the coating bath. A high concentration of dissolved aluminum is detrimental to the coating reaction, although in some situations low concentrations may be quite unobjectionable and in some instances may actually be advantageous. In still other situations even very small amounts of aluminum in the bath, for example, as little as 1 gram or more per liter will prove to be disadvantageous. It will be seen therefore that the control of the amount of dissolved aluminum which accumulates in these baths constitutes a major problem in industrial applications involving coating procedures of this general nature.

The dissolved aluminum which accumulates in coating baths of the character described is believed to be present in the form of $AlF_3$ and this aluminum fluoride salt is only very slightly ionized in these acid baths. Furthermore, any fluorine present as $AlF_3$ is not in itself sufficient to provide the solution activity which is necessary for the satisfactory coating of aluminum surfaces. This makes it necessary to add fluoride ion in order to maintain the solutions in condition to produce the desired coatings. One method for controlling the dissolved aluminum in these coatings baths is described in our copending application Serial No. 784,420, filed January 22, 1959, now U.S. Patent No. 2,936,254. This method involves the removal of substantially all of the dissolved aluminum from the coating solutions by carefully controlled periodic replenishment of the bath with respect to its fluoride content.

While this process leads to excellent results for many purposes it is, of course, open to objection in situations where the presence in the bath of some dissolved aluminum is a desirable feature as will further appear.

With the foregoing in mind, the principal object of the present invention is to provide an economical process for removing only a portion of the dissolved aluminum from the type of coating solutions heretofore described. A concomitant object is to provide an aluminum coating process of the general character referred to by means of which modifications in the intensity of the color of the coating can be produced. A still further object is to provide an aluminum coating solution which is substantially free of dissolved cations other than aluminum and hydrogen. These and such other objects and advantages as may appear hereinafter or which may be incident to the present invention are attained in accordance with the following teachings.

The present invention is based upon the discovery that coating baths of the character described can be maintained at any desired level of aluminum concentration over long periods of time even under very heavy bath loading conditions if there be added to the solution 3 mols of alkali metal ions for each mol of dissolved aluminum which it is necessary to remove in order to leave in the solution the desired quantity of aluminum. At the same time it is essential that sufficient fluoride ion be added to replace the fluoride which is precipitated as insoluble alkali fluoaluminate. Furthermore, in addition to the alkali metal which is added to precipitate the sparingly solube alkali fluoaluminate salts it is also essential, according to the present invention, that sufficient hydrofluoric acid, chromic acid, and phosphoric acid be added to maintain these constituents at their desired levels.

The baths used with our invention are initially prepared from and replenished by additions of hydrofluoric, chromic and phosphoric acids and the alkali metal ions added for the purpose of precipitating the aluminum are chosen from the class which consists of sodium and potassium and best results are obtained when 2 mols of potassium are used for each mol of sodium. In effecting the desired precipitation of aluminum it is important to avoid use of cations other than sodium and potassium inasmuch as the coating baths should be maintained substantially free of cations other than hydrogen and aluminum.

By way of illustration the process of the present invention can be carried out by withdrawing a portion of an aluminum coating bath of the character described and removing it from the main bath to a separate aluminum precipitation tank. There is then added to this withdrawn portion of the bath an amount of sodium and potassium ions which, collectively, are stoichiometrically insufficient to precipitate all of the dissolved aluminum with the understanding of course, as described above, that the combined mols of sodium and potassium must be three times the mols of aluminum which it is desired to precipitate. In this connection care must be taken to avoid adding more than three mols of the alkali metals for each mol of aluminum in the bath in order to be sure that the coating solution remains free of alkali metal.

When the desired amount of aluminum has been so precipitated the treated portion of the bath may then be decanted, filtered or otherwise separated from the precipitate and returned to the main body of the bath. At the same time replenishment of the coating bath may be accomplished either before, during or after the precipitation stage by adding sufficient hydrofluoric acid, chromic acid and phosphoric acid to the bath to maintain the bath in its coating condition, all additions being made as indicated by conventional bath analyses according to well established prior art practices.

In practice precipitation of the aluminum in the form of the alkali fluoaluminate may be accomplished either by a batchwise technique whereby portions of the coating solutions are separated from the main bath, treated and then returned as already described or, and sometimes preferably, this may be done on a continuous basis by means of a technique where coating solution is constantly flowed out of the coating bath to a treatment tank and then returned to the main bath after separation of the insoluble fluoaluminate salt has been effected.

The amount of aluminum which it may be desired to retain in any coating bath will depend upon a number of factors such as the nature of the alloy being treated, the weight of the coating desired, the color of the coating, the time of the treatment and the temperature at which it is carried out. Factors of this kind may all have a bearing upon the amount of dissolved aluminum which can be retained or tolerated in the treating solutions. It can be seen therefore that the amount to be retained is not critical insofar as the invention itself is concerned and can best be decided in each individual instance at the actual site of the operation where the various conditions involved may be carefully weighed in order to secure optimum results. Once having determined for any particular installation what the content of aluminum should be or may be, all that it is necessary to do is to employ the principles of the invention to remove the rest of the aluminum in the manner described.

The following is a description of a specific way in which the invention may be carried out, but it is introduced merely by way of illustration and should not be considered as in any way limiting the invention as defined in the appended claims.

A suitable quantity (one gallon for the example which follows) of a fresh aqueous coating solution was prepared containing per liter the following ingredients:

HF _____ 2.1 grams.
$CrO_3$ _____ 10 grams.
$H_3PO_4$(100%) _____ 28.5 grams (24.1 mls., 75%).

The initial etch rate of this solution as measured by fluoride attack on a 3¼" x 4" piece of lime soda glass (such as described in U.S. Patent 2,814,577) was 52 mgs. A series of aluminum coils was subsequently processed through this solution at 115° F. using a 3-minute dip for each coil. During the processing of the aluminum articles a portion of the bath was continually withdrawn, circulated through an external tank and subsequently returned to the main bath. Replenishment of the bath, which was based on standard hexavalent chromium titration analysis and active fluoride measurement by means of the glass etch rate test noted above, was effected after each 6 sq. ft. increment of aluminum surface had been treated. Replenishment chemicals consisted of 14 mls. of an aqueous admixture which contained 1.93 grams of $CrO_3$ and 5.5 grams of phosphoric acid (100%) and 8 mls. of a separate aqueous solution containing 21% (wt./volume) of hydrofluoric acid (equivalent to 1.6 grams of fluoride ion). This treatment and replenishment cycle was continued until 96 sq. ft. of aluminum surface had been coated and 16 separate replenishments using the amounts of chemicals shown above had been completed.

After this treatment of 96 sq. ft. of aluminum had been processed through the bath, analysis indicated an aluminum content of 2.12 grams/liter. Coating weights on the aluminum (alloy 24S) were approximately 400 mgs./sq. ft. These were considered satisfactory for the operation involved so it was decided to maintain the level of dissolved aluminum at about 2 gms./liter. Accordingly, as additional aluminum was being processed through the bath and while using the same immersion and temperature controls noted above, a portion of the bath was continuously withdrawn and delivered to an external precipitation tank in which tank there was added 14 mls. of the same replenishment ingredients for each 6 sq. ft. of aluminum surface which was treated, the said replenishment ingredients comprising chromic acid and phosphoric acid as previously employed plus 13.5 mls. of a separate aqueous solution containing 21% (wt./volume) of hydrofluoric acid (equivalent to 2.7 grams of fluoride ion). In addition to the foregoing there was also added 16.2 grams of an aqueous admixture containing 0.94 gram of sodium hydroxide and 2.66 grams of potassium hydroxide which addition caused the precipitation of the alkali fluoaluminate.

The precipitated salt ($K_2NaAlF_6$) was allowed to settle in the precipitation tank and the treated solution was siphoned from the top of the tank and returned to the coating bath. Analysis of the treating bath being returned to the main coating solution showed that the hexavalent chromium and phosphoric acid content were at the original desired levels, that the bath etch rate was 51.6 mgs. on an exactly similar 3¼" x 4" piece of lime soda glass and that the bath was substantially free of dissolved cations other than aluminum and hydrogen.

Additional aluminum coils were subjected to the coating action of this solution with replenishment being effected after each 6 sq. ft. increment was coated as above until a total of 48 additional sq. ft. of aluminum surface had been treated. At this point analysis of the aluminum content contained within this bath indicated that there was actually 2.21 grams/liter of dissolved aluminum. Slight discrepancies in analysis and in amounts calculated to be present are attributed to differences in drag out losses which are inherent in this type of process.

It is within the purview of this invention to utilize sodium and potassium ions in any of their combined forms which, when added to the coating bath, will have no deleterious effect on subsequent coating formation. For example, instead of using the alkali metal hydroxides as indicated in the specific embodiment of this process, the corresponding fluoride or carbonate salts could have been employed.

This application is a continuation-in-part of applicants' earlier application Serial No. 860,077, filed December 17, 1959.

We claim:

1. In the art of coating a succession of aluminum surfaces by treating them with an aqueous acid bath consisting essentially of a solution of hydrofluoric, chromic and phosphoric acids; the method of controlling the composition of the bath which comprises adding said ingredients as required to maintain the concentration thereof as desired and, as the bath is continued in operation, retaining therein a portion of the aluminum dissolved from the surfaces being treated, by withdrawing solution from the bath and delivering it to a precipitation tank, adding to the withdrawn solution sodium and potassium ions in an amount which is stoichiometrically sufficient to precipitate only that quantity of the dissolved aluminum which it is necessary to remove in order to leave in the solution a sufficient quantity to produce a uniform coating over an extended period of time, the combined mols of sodium and potassium being three times the mols of aluminum which is to be precipitated but not more, separating the so-treated solution from the precipitate and returning it to the bath, and repeating the precipitating procedure as may be necessary to maintain in the bath the said desired quantity of aluminum dissolved from the work.

2. The method of claim 1 wherein two mols of potassium are used for each mol of sodium.

3. The method of claim 2 wherein the potassium and the sodium are introduced by the addition of potassium and sodium hydroxides.

References Cited in the file of this patent
UNITED STATES PATENTS

| | | |
|---|---|---|
| 2,438,877 | Spruance | Mar. 30, 1948 |
| 2,909,455 | Newhard et al. | Oct. 20, 1959 |
| 2,936,254 | Newhard et al. | May 10, 1960 |